June 3, 1952  E. C. NICHOLS  2,598,821
TEMPLE MOUNTING MEANS FOR LOOMS
Filed Nov. 8, 1950  2 SHEETS—SHEET 1
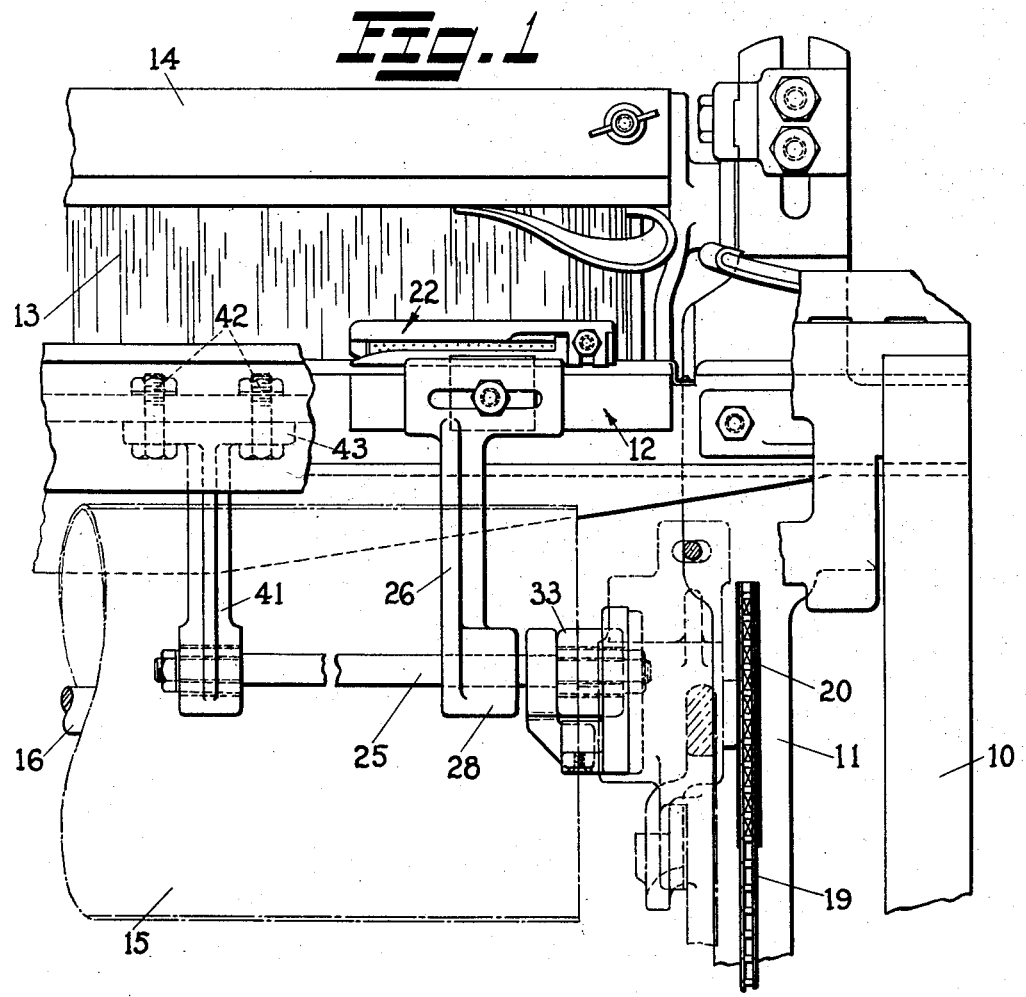
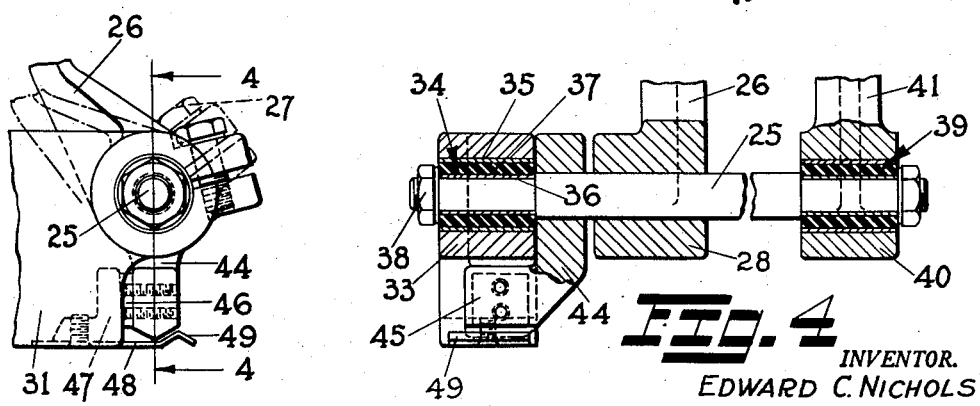
INVENTOR.
EDWARD C. NICHOLS
BY
Rodney C. Southworth
ATTORNEY June 3, 1952  E. C. NICHOLS  2,598,821
TEMPLE MOUNTING MEANS FOR LOOMS
Filed Nov. 8, 1950  2 SHEETS—SHEET 2
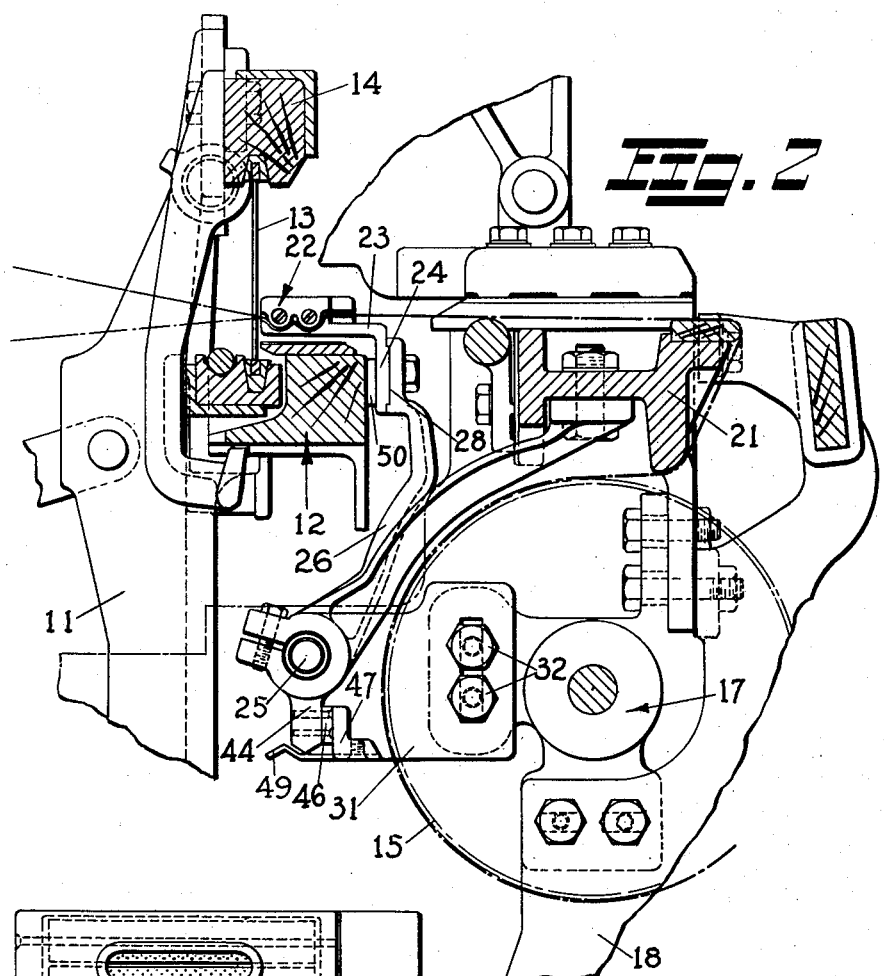
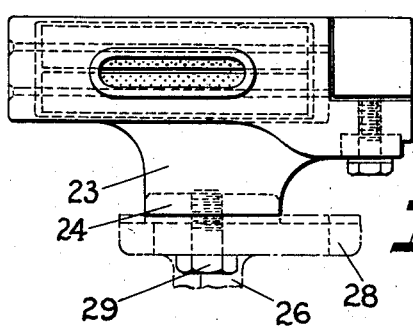
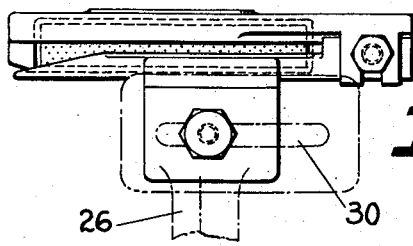
INVENTOR.
EDWARD C. NICHOLS
BY
Rodney C. Southworth
ATTORNEY … (continued)

UNITED STATES PATENT OFFICE 2,598,821

TEMPLE MOUNTING MEANS FOR LOOMS

Edward C. Nichols, Upton, Mass., assignor to Draper Corporation, Hopedale, Mass., a corporation of Maine Application November 8, 1950, Serial No. 194,683

11 Claims. (Cl. 139—298)

This invention pertains to temples for looms, and more specifically, to improvements in the mounting means upon which said temples are moved and by which they are resiliently biased in one direction.

It is a general object of the invention to improve temple mounting means for looms in such manner as to lessen the noise generally associated with these elements, to obviate to a great extent the wear of the moving parts and to devise a temple mounting means for which no lubrication whatsoever shall be required.

It is a more specific object of the invention to provide mounting means for moving temples for looms which shall comprise resilient rubber, or rubber-like bearings or bushings so devised as to provide not only a suitable, long-lived bearing upon which the temples may be oscillated to and fro, but which shall also serve to provide the biasing force necessary for returning the temples to an initial position from which they are displaced upon successive beat-up movements of the reed.

It is a more specific object of the invention to so devise temple mounting means of the type described which shall be positioned below the level of the fabric being woven and which shall be mounted within bearings maintained inwardly of the moving swords upon which the lay is oscillated, and which shall also be provided with suitable adjustments by which the tension in the rubber-like bushings may be adjusted thereby to facilitate the initial settings of the mechanism and to provide easy adjustment thereof at periodic intervals as shall be found necessary.

It is a further object of the invention to devise a temple mounting means of the type described in which the temples themselves may be adjusted laterally of the loom thereby to accommodate them to the weaving of fabrics of different widths, this adjustment being capable of being effected without disturbing the other parts of the temple mounting means or the settings thereof.

It is a further object of the invention to devise simple means by which the temples may be independently latched in an inactive or inoperative position, and it is also a further object to devise a very simple arrangement for retaining the rubber-like, torsion-resistant bushings so that they may be easily clamped in an adjusted position, and also so that they may be installed or removed easily and quickly, thereby to make their replacement, if necessary, one which may be accomplished with a minimum of effort and in a very short period of time.

Other objects of the invention will become apparent from the following more detailed disclosures.

Temples are employed on practically all looms for weaving and maintaining the fabric relatively taut and at a prescribed width at the point of weaving, these elements being capable of functioning along various principles, although it has become more or less conventional to employ the rotary type in which small rollers covered with rubber or having set therein small pointed, fabric-engaging pins are arranged helically or are otherwise disposed at such angle to the passing fabric that, as the fabric moves through the said temple means, it is stressed widthwise. These temples have either been mounted at the ends of arms adapted to be swung to and fro throughout a relatively small angular extent, or at the ends of supporting members adapted to reciprocate in suitable holder or bearing means, each of these different mountings having been provided with resilient biasing means which always tends to move the temples rearwardly of the loom or contra to the direction in which the fabric is being woven and taken up. The movement of the temples is generally stopped in a rearward direction at some convenient, prescribed point, while the forward movement thereof against the tension of said resilient means is brought about by contact of the lay or certain abutments forming a part thereof which engage against convenient and appropriately formed cooperating surfaces on some part of the temple means itself or the supporting structure therefor.

The movement of the temples as above described has always been provided for by bearings of some metallic type which preferably should have been lubricated, but which must be very carefully lubricated, although in many instances, they are not. A lack of lubrication naturally causes premature wearing of the parts so that these temple mounting devices have always been subject to a great deal of wear necessitating replacement of parts after a shorter period of time than should have been the case, and in some instances, causes an abrasion of surfaces, the abraded material from which has been deposited on the fabric being woven thereby causing stains which have detracted from its value. In the event lubrication is attempted, it should be applied very sparingly, but since there is a human element involved, there has frequently resulted an excess of lubrication, so that the lubricant has been transferred to the material being woven. The stains therefrom may spoil that material, at least for its intended purpose, and, to say the least, frequently detract from the value of certain portions thereof.

The temples, especially on looms operating at relatively high speeds, account for a very great portion of the noise attendant upon operation of the loom and as the temple mechanisms wear, this noise becomes more pronounced, there being very little that can be done about it insofar as the present structures are concerned.

The metallic working parts of the temple mounting means have in some instances become corroded, especially when looms have been lying idle in damp climates for a short period of time, and if relatively fine materials are being woven, the temple means must be cleaned or this corrosion removed in order to avoid the great likelihood that it will become deposited upon the material being produced once the loom is started.

In obviating the above mentioned undesirable characteristics of temple mechanisms as heretofore constructed, and in realizing the objects of the invention above set forth, applicant has devised temple mounting means which is relatively simple and which definitely positions the temples in a proper plane and limits their motion to confine their oscillation to a very precise pathway, all this being accomplished without resort to lubrication at all, by moving the temple mounting means on the bearings which are not subject to wear, and which possess the dual function of bearing means and also of resiliently biasing the temples against the general movement of the fabric being produced. Instead of slideably mounting the temples within a translating mechanism, the present invention provides for their being rocked to and fro or oscillated throughout a desired angular extent upon separate shafts or similar pivot means, these shafts themselves being mounted in a plurality of resilient rubber, or rubber-like, bushings as will be described hereinafter in greater detail. These resilient rubber bushings may be so set as to provide the requisite torque to act as a return biasing means thereby to return the temples and their supporting structure to a position limited by a suitable stop means after each movement thereof incidental to the beat-up function. According to the invention, the temples themselves are supported upon arms which are in turn fixed to the shafts or spindles carried in the elastic or rubber-like bushings. Preferably each of these shafts is carried in its own independent bushings so that the two temples are entirely independent both as to adjustments and as to action upon the fabric engaged by them, also either temple may be moved to an inactive or inoperative position without disturbing the other, as will be described hereinafter in greater detail.

Since in conventional looms of the fly shuttle type it is a fact that there is very little space below the fabric level and between the harness mechanism and the fabric take-up and wind-up means, the mounting of the temple supporting structure below the fabric presents certain difficulties. Furthermore, the oscillating lay mounted as it is on swords pivoted adjacent the lower part of the loom framework limits the lateral space available for this temple supporting structure. In accordance with the invention hereinafter disclosed in detail, the temple mounting means is confined between the plane of the sword oscillations and also behind the fabric take-up mechanism, but not in a position to interfere with the harness mechanism. More specifically, certain brackets are attached to the cloth roll supporting stand and to the breast beam, these being secured in position and not requiring further adjustment or attention once the mechanism has been assembled. The shaft is then mounted in bearing bosses at the said brackets, the bearing means intermediate the brackets and the shaft comprising a resilient rubber torsion bushing of any one of the types conveniently employed for the purpose, but preferably one such as is hereinafter illustrated by way of example and which comprises an annulus of rubber bonded between an inner and an outer metallic sleeve. These may be clamped on the shaft and also within the bearing bosses at the end of the brackets, it being possible to adjust the angular disposal thereof and also lock the said bushings in any position such as may finally be determined as that most appropriate for the particular installation at hand.

Stop means is also clamped to the shaft and functions against some convenient part of the brackets or other fixed portion of the loom structure. This stop means also functions in conjunction with a spring detent to lock the temple releasably in a position in which it is somewhat withdrawn from the fell of the fabric thereby to facilitate tying in or otherwise manipulating the filling or other threads at that point.

The invention will be described hereinafter by reference to the accompanying figures of drawing wherein:

Fig. 1 is an elevational view of a part of one end of a loom to which the invention has been applied, certain parts being illustrated in dot-and-dash lines thereby to render more effective the showing of those parts which comprise the invention itself.

Fig. 2 is a section taken transversely of the loom and showing the invention as seen from a different viewpoint.

Fig. 3 is a detail view illustrating the stop means and other parts incidental thereto by means of which a temple may be held in an inactive or inoperative position.

Fig. 4 is a section taken at line 4—4, Fig. 3, and showing details of the elastic bushings themselves.

Figs. 5 and 6 are plan and elevational views, respectively, of one temple illustrating the mode of connection of that temple mechanism to the supporting arm therefor and the adjustment made possible by that connecting means.

Now referring to Fig. 1, the loom to which the invention has been applied comprises among other parts a loomside 10, a sword 11, a lay structure generally indicated by numeral 12 and including a reed 13 and a hand rail 14. The fabric after being woven is taken up over a take-up roller or cylinder 15 mounted on a shaft 16 carried in suitable bearings at its ends, one said bearing being generally designated by numeral 17, Fig. 2, and being suitably attached to a vertical upright member 18 which will hereinafter be termed a cloth roll stand support and which is in fact one of two vertical, structural members by means of which various parts of the cloth roll or fabric wind-up mechanism and the take-up roll are supported. The take-up roll is driven positively and it drives the cloth roll through a chain 19, sprocket 20 and other parts (not shown). The loom structure further includes a breast beam 21 better shown in Fig. 2, and which has attached thereto other elements forming conventional parts of the loom and which need not be described here.

Only one side of the loom and enough of the mechanism thereat necessary for a fair understanding of the invention has been illustrated thereby to make it possible to show the parts on a larger scale, it being understood that the opposite side of the loom is characterized by a similar construction and that therefore a description of one side only need be given. The temple assembly itself generally indicated by numeral 22 comprises a pod or casing structure within which are enclosed suitable temple rolls such as are commonly employed for holding the fabric widthwise. The temple details themselves may be varied greatly and therefore the particular construction thereof forms no part of the present invention. The temple means terminates in an extending mounting bracket 23 which has a more or less vertically disposed mounting pad 24 which depends therefrom and serves as an attaching means for adjustably fixing the temple to its supporting arm.

The temple mounting means includes among other elements a shaft 25 which is of suitable length to support a temple carrying arm 26 and to extend laterally therefrom to be supported in bearings at either end. The arm 26 is preferably adjustably clamped to the shaft by a clamping screw 27, Fig. 3, which passes through the projections extending laterally from the hub 28 of the arm thereby providing for a split construction which may be readily slipped over the shaft, but may then be fixed in position thereon as desired. This arm 26 is curved as illustrated to avoid interference with the take-up roller 15 and at its upper end provides a suitable complementary mounting pad 28 to which the pad 24 may be attached. One of the elements is grooved and the other has a corresponding tongue portion so that horizontal alignment is properly established and maintained. The attaching means comprises a screw or bolt 29 which passes through an elongated slot in one of the members and is threaded into a tapped hole in the other. Here the slot 30 is formed in pad 28 at the upper end of arm 26 and the bolt passes through that slot being threaded into the pad 24. Of course, this construction might be reversed in some instances. By loosening screw 29 and by sliding the temple mechanism laterally, it may be adjusted so as properly to be positioned for weaving any particular width of fabric, of course, within a reasonable range.

Now referring to Figs. 1, 3 and 4, the shaft 25 is supported in brackets adjacent either end thereof. The outer bracket indicated by numeral 31 and shown in Fig. 2 in greater clarity, is attached by bolt means 32 to an extending portion of the bearing member 17. These bolts pass through suitable slots or enlarged openings in one of the members and are threaded into the other or otherwise retained by nuts as may seem appropriate. This bracket 31 extends rearwardly of the loom and has a boss 33 at its rearmost end in which is clamped one of the torsion bushings indicated by numeral 34, Fig. 4, and comprising an outer sleeve 35, an inner sleeve 36, both of these preferably being formed from sheet metal and having between them a resilient rubber, or rubber-like, annular bushing member 37 which is preferably bonded to the adjacent surfaces of the sleeves, or in some other way retained against relative movement with respect thereto. The clamping of the outer sleeve 35 in hub 33 retains the bushing laterally and also prevents relative movement of the sleeve 35 with respect to the hub. The inner sleeve 36 is compressed axially since it bears at one end against a shoulder on shaft 25 and is clamped by means of nut 38 and an accompanying washer threaded on to the reduced end of the shaft at its other end. By loosening either the nut 38 or the screw which clamps the split hub 33 in engagement with the outer surface of the bushing, the same may be adjusted angularly as may be essential when setting up the mechanism initially. It is also a very simple matter to remove a bushing and to replace it in the event that becomes desirable.

At the opposite end the shaft is held in a similar bushing indicated by numeral 39 retained in a hub 40 at the lower end of a bracket arm 41 which is in turn bolted to the underside of the breast beam 21 all as illustrated in Figs. 1 and 2, bolts 42 passing through suitable apertures in the breast beam and also in a mounting pad 43 which is formed integrally with the arm 41 at its upper end. This bushing 39 is clamped in place in a similar manner to bushing 34 and may be removed in the same way. These bushings, as may be seen, provide a resilient mounting for the shaft 25 and one which supports temple 22 and its mounting arm 26 independently and as will hereinafter be seen in a manner by which suitable adjustments are easily taken care of. The brackets 31 and 41 are so disposed that they do not interfere with other parts of the loom, it being seen that the outermost bracket 31 is supported and occupies a position within the plane swept by the adjacent sword which would otherwise interfere with shaft 25, if extended. The inner arm or bracket 41 is suitably curved to avoid interference with take-up roll 15 and also passes beneath the lay 12 or extensions thereof as the same move forwardly at beat-up.

Now referring to Figs. 3 and 4, the rotation of shaft 25 and the oscillating movement of the arm 26 under the influence of the pretensioned or preloaded rubber bushings is stopped or limited by contact of certain adjustable arms, one for each shaft and some adjoining part of the bracket by means of which the shaft is borne. Here a depending arm 44 is so constructed as to be clamped fixedly, but adjustably with respect to the shaft 25 and this arm has an offset portion 45 to which is fixed a pad of fibre or other resilient shock absorbing material 46 attached by screws or in any other satisfactory manner, the purpose of which is that of making a more or less noiseless contact with the abutting portion 47 of the bracket 31. This arm 44 being adjustable as explained, it is possible to set the mechanism so that there shall be a predetermined amount of torsion preloaded in the bushings, for example, about 90 inch pounds according to established practice.

The temple and its attached or pivoted mounting structure hereinabove described is capable of being moved from the normal oscillative range throughout which it functions during weaving to a slightly removed position forwardly in the loom so that it is temporarily maintained out of the way, for example, at such times as the weaver may pick out filling threads or has reason to work at or adjacent the temple and to render the fell of the fabric more accessible. For this purpose, a spring 48 is attached at the lower surface of the bracket 31 and extends outwardly below and beyond the normal range of movement of arm 44 having its end portion formed as a latch or detent 49 engageable with a cooperating or complementary end of the arm. As the temple is moved forwardly so that arm 26 moves from the full to the dot-and-dash line position of Fig. 3, the lower more or less angularly formed, offset portion 45 of arm 44 snaps beyond detent 49, the natural resilience of the spring material being such that it will hold the temple in the so-called inactive position until it is forcefully pushed rearwardly so that the spring of the detent is thereby overcome releasing the parts so that they return to their normal positions.

The movement of the temples and of the arm 26 comes about due to contact of the forward edge of lay beam 12 with an abutment in the form of a leather or fibre strip 50 attached at that surface of the beam with the adjacent portion or surface of the pad 24, Fig. 2. It is understood that the movement of the temples becomes necessary in looms of this type since it is desirable to have the temples function as close to the fell of the fabric being woven as is practicable, but as beat-up occurs the temples are moved as described throughout a small angular oscillative movement toward the front of the loom thereby to avoid undesirable interference between the temple mechanism proper and the reed or other parts at the lay. The pivoting of the temples is such that the movement, although it does actually conform to an arc of a circle, is about a radius of sufficient length and is of such limited extent relatively to that radius, that the actual movement of the temples conforms very closely to a straight line and is also directed in the general direction in which the fabric is travelling at that time.

While the description to this point has been devoted to a form of invention in which two bearings or bushings are provided for each of two shafts 25 thereby to mount the temples independently, it is contemplated that the shaft 25 may in certain instances be carried clear across the loom from one bracket 31 to an opposite and similar bracket at the other side and that intermediate brackets 41 may then be dispensed with. In certain looms that may prove sufficient and perhaps more desirable, since there are other mechanisms adjacent the center of the loom, for example, center fork filling motions which might interfere or might make difficult provision of proper bearings supports at or adjacent the center. In such instances movement of both temples must conform and movement of one to an inactive position would necessarily move the opposite temple to a similar position, however, that is not undesirable since the releasing mechanism herein illustrated may be provided at one or both sides and a releasing of one temple to return it to its normal, active position would at the same time release the opposite.

Now having described the physical characteristics of the invention, a brief description of the manner of setting and operating it will be given. While there may be more than one method employed in setting up the device, it is convenient to clamp the elastic rubber bushings on the shaft 25, then to insert the bushings axially in the split bosses at the ends of the brackets in which they are carried and thereafter to clamp those bosses thereby clamping the outer bearing sleeves so that the shaft is rigidly or tightly held in proper position, the only movement possible with respect thereto being one of oscillation due to the torsional deflection in the rubber bushings themselves.

It is to be understood that the arm 26 and stop member 44 have been assembled on the shaft before the bearings and at first the arm 26 is clamped by tightening screw 27, Fig. 2, so that it may be employed for the purpose of rotating the shaft 25 sufficiently to introduce into the bushings the amount of preloaded torsional resistance which is desired. When that point has been attained, the stop member is set so that abutment 47 is just contacted by the offset end of the arm 44, or, more preferably, the absorbent material 46 attached thereto. Then the arm 44 is, of course, clamped in position whereupon the temple may be properly set with respect to the width of the fabric and also with respect to the fell by loosening the screw 27 and moving the arm 26 laterally as well as swinging it angularly about shaft 25 whereupon it is fixed in position when properly set. The adjustment of the temple 22 by sliding its pad 24 along the slotted complementary surface of the pad 28 is also to be availed of and it is to be understood that the arms 26 must be so set that they do not interfere with other parts of the loom, for example, stop motion parts which may be adjacent thereto. The adjustment made possible by moving arm 26 along the shaft and also by moving the temple 22 laterally of the plane swept by the arm makes it possible to position each of these elements in the most advantageous manner for the particular loom involved and also with regard to the width of and other characteristics of the particular fabric being woven.

While it is contemplated that the elastic bushings be clamped both on the shaft and within the boss at the end of the supporting arms, it is conceivable that one only may be so clamped and thus a single bushing may, if desired, provide all of the torsional resistance or biasing effect necessary to maintain the temples rearwardly in a position close to the fell of the fabric. In that case the other bushing may merely serve as a bearing and may not involve the use of rubber.

While one embodiment of the invention has been illustrated and described, certain variations also being disclosed, it is to be understood that the inventive concept may be carried out in a number of ways. The invention is, therefore, not to be limited to the precise details described, but is intended to cover all variations and modifications thereof falling within the spirit of the invention and the scope of the appended claims.

I claim:

1. In a loom having temples, a mounting means for said temples which comprises a shaft for each temple, an arm fixed to said shaft and having its respective temple attached at its relatively free end, and bearing means for each said shaft which comprises a bracket adjacent each end thereof attached to a relatively fixed part of the loom, and torsion resisting, resilient bushings restrained against relative rotation within the brackets and upon the shaft, at least one of which is pretensioned to bias the temple carrying arm in a direction contra to the motion of the fabric being woven.

2. In a loom having temples, a mounting means for said temples which comprises a shaft for each temple, an arm fixed to said shaft and having its respective temple attached at its relatively free end, each said shaft and arm being mounted below the fabric plane so as to maintain the temples at the fabric level, and bearing means for each said shaft which comprises a bracket adjacent each end thereof attached to a relatively fixed part of the loom, and torsion resisting, resilient bushings restrained against relative rotation within the brackets and upon the shaft, at least one of which is pretensioned to bias the temple carrying arm in a direction contra to the motion of the fabric being woven.

3. In a loom having temples, a mounting means for said temples which comprises a shaft for each temple, an arm fixed to said shaft and having its respective temple attached at its relatively free end, each said shaft and arm being mounted below the fabric plane so as to maintain the temples at the fabric level, and bearing means for each said shaft which comprises a bracket adjacent each end thereof attached to a relatively fixed part of the loom, and torsion resisting resilient bushings fixed within the said brackets and upon the shaft, at least one of said bushings being relatively adjustable angularly thereby to provide for pretensioning the resilient bushing with a predetermined amount of angular deflection thereby to bias the temple carrying arm in a direction contra to the motion of the fabric being woven.

4. In a loom having temples, a mounting means for said temples which comprises a shaft for each temple, an arm fixed to said shaft and having its respective temple attached at its relatively free end, each said shaft and arm being mounted below the fabric plane so as to maintain the temples at the fabric level, and bearing means for each said shaft which comprises a bracket adjacent each end thereof attached to a relatively fixed part of the loom, and torsion resisting resilient bushings fixed within the said brackets and upon the shaft, at least one of said bushings being relatively adjustable angularly thereby to provide for pretensioning the resilient bushing with a predetermined amount of angular deflection thereby to bias the temple carrying arm in a direction contra to the motion of the fabric being woven, stop means for limiting the movement of each temple and arm under the influence of said torsion resistant bushings, and a latch means for independently retaining either temple in an inactive or withdrawn position.

5. In a loom having temples, a mounting means for said temples which comprises a shaft for each temple, an arm fixed to said shaft and having its respective temple attached at its relatively free end, each said shaft and arm being mounted below the fabric plane so as to maintain the temples at the fabric level, and bearing means for each said shaft which comprises a bracket adjacent each end thereof attached to a relatively fixed part of the loom, and torsion resisting resilient bushings fixed within the said brackets and upon the shaft, at least one of said bushings being relatively adjustable angularly thereby to provide for pretensioning the resilient bushing with a predetermined amount of angular deflection thereby to bias the temple carrying arm in a direction contra to the motion of the fabric being woven, stop means for limiting the movement of each temple and arm under the influence of said torsion resistant bushings, and a latch means which comprises an arm fixed to each shaft and a detent resiliently pressed against said arm for holding it releasably in a position withdrawn from its normal range of oscillation.

6. In a loom having temples, a mounting means for said temples which comprises a shaft for each temple, an arm fixed to said shaft and having its respective temple attached at its relatively free end, each said shaft and arm being mounted below the fabric plane so as to maintain the temples at the fabric level, and bearing means for each said shaft which comprises a bracket adjacent each end thereof attached to a relatively fixed part of the loom, and torsion resisting, resilient bushings within the brackets and on the ends of said shaft, at least one of said bushings comprising a resilient rubber annulus held between metallic sleeves, the inner one of which is clamped axially upon its respective shaft end thereby to provide adjustment of the bushing angularly upon the shaft and to fix it in a particular adjusted position.

7. Mechanism as defined in claim 6 wherein said one bushing comprises a resilient rubber annulus bonded between outer and inner metallic sleeves, the outer of which is clamped fixedly and radially in said bracket and the inner of which is clamped axially upon its respective end of said shaft.

8. In a loom having a lay movable upon lay swords and temples, a mounting means for said temples which comprises a shaft for each temple, an arm fixed to said shaft and having its respective temple attached at its relatively free end, and bearing means for each said shaft which comprises brackets below the fabric plane in the loom and disposed between the lay swords, said brackets being attached to relatively fixed parts of the loom intermediate the swords, and torsion resisting, resilient bushings restrained against relative rotation within the brackets and upon the shaft, at least one of which is pretensioned to bias the temple carrying arm in a direction contra to the motion of the fabric being woven.

9. In a loom having a lay movable upon lay swords and temples, a mounting means for said temples which comprises a shaft for each temple, an arm fixed to said shaft and having its respective temple attached at its relatively free end, and bearing means for each said shaft which comprises brackets below the fabric plane in the loom and disposed between the lay swords, said brackets being attached to fixed parts of the loom which include the cloth roll stand at the outer end of each shaft and the breast beam for each inner bracket, and torsion resisting bushings restrained against relative rotation within the brackets and upon the shaft, at least one of which is pretensioned to bias the temple carrying arm in a direction contra to the motion of the fabric being woven.

10. Mechanism as defined in claim 1, wherein the temples are attached at the relatively free ends of the arms by means which provides adjustment laterally of the fabric being woven.

11. Mechanism as defined in claim 1, wherein the temples are attached at the relatively free ends of the arms by a laterally slidable connectinging means comprising a slot in one of the elements and a bolt means passing through the other means and said slot.

EDWARD C. NICHOLS.

REFERENCES CITED

The following references are of record in the file of this patent:

UNITED STATES PATENTS

| Number | Name | Date |
| --- | --- | --- |
| 177,227 | Dutcher | May 9, 1876 |
| 408,354 | Norton | Aug. 6, 1889 |
| 456,916 | Stimpson | July 28, 1891 |
| 504,288 | Tomlinson | Aug. 29, 1893 |